(12) United States Patent
Rible

(10) Patent No.: US 7,787,384 B2
(45) Date of Patent: Aug. 31, 2010

(54) METHOD FOR TESTING A COMMUNICATION NETWORK BY MEANS OF A TERMINAL

(75) Inventor: Frederic Rible, Nozay (FR)

(73) Assignee: ERCOM Engineering Reseaux Communications, Veilzy Villacoublay (FR)

( * ) Notice: Subject to any disclaimer, the term of this patent is extended or adjusted under 35 U.S.C. 154(b) by 32 days.

(21) Appl. No.: 12/085,491

(22) PCT Filed: Nov. 17, 2006

(86) PCT No.: PCT/FR2006/051190

§ 371 (c)(1),
(2), (4) Date: Aug. 19, 2008

(87) PCT Pub. No.: WO2007/060358

PCT Pub. Date: May 31, 2007

(65) Prior Publication Data

US 2009/0161552 A1 Jun. 25, 2009

(30) Foreign Application Priority Data

Nov. 23, 2005 (FR) ................................ 05 53574

(51) Int. Cl.
G06F 11/00 (2006.01)
H04L 1/00 (2006.01)
H04L 12/26 (2006.01)

(52) U.S. Cl. .................. 370/241; 370/242; 370/252

(58) Field of Classification Search ............... 370/241, 370/242, 252; 382/298, 263
See application file for complete search history.

(56) References Cited

U.S. PATENT DOCUMENTS

| 6,344,903 B1* | 2/2002 | Derhak et al. ............... 358/1.9 |
| 6,707,943 B2* | 3/2004 | Gicquel et al. ............. 382/199 |
| 7,046,862 B2* | 5/2006 | Ishizaka et al. ............ 382/298 |
| 7,164,805 B2* | 1/2007 | Takahira .................... 382/263 |
| 7,535,849 B2* | 5/2009 | Laiho et al. ............... 370/241.1 |
| 2005/0152610 A1* | 7/2005 | Hagiwara et al. ........... 382/239 |
| 2005/0281477 A1* | 12/2005 | Shiraki et al. ............. 382/255 |
| 2005/0286486 A1* | 12/2005 | Miller ....................... 370/351 |
| 2008/0250459 A1* | 10/2008 | Roman ....................... 725/62 |

FOREIGN PATENT DOCUMENTS

EP 0366235 5/1990
FR 2805429 8/2001

* cited by examiner

Primary Examiner—Chi H Pham
Assistant Examiner—Robert Lopata
(74) Attorney, Agent, or Firm—Fulbright & Jaworski, LLP

(57) ABSTRACT

The invention relates to a method for testing a communication network by means of a terminal, which is provided with a screen and is used for exchanging information via a telecommunication network. The inventive method comprises the following steps: a step for periodically totally or partly retrieving values of the terminal screen pixels, a step for computing on the base of said pixel values one or several parameters representative for the screen content and a step for transmitting said one or several parameters to storing and/or analyzing means.

15 Claims, 2 Drawing Sheets

METHOD FOR TESTING A COMMUNICATION NETWORK BY MEANS OF A TERMINAL

RELATED APPLICATIONS

This application claims priority from PCT/FR2006/051190 filed Nov. 17, 2006 and French Application No. FR 05 53574 filed Nov. 23, 2005, both incorporated by reference in their entireties.

FIELD OF THE INVENTION

The present invention relates to a method for testing the quality of a communication network, the test being implemented by analyzing the contents of the screen of a terminal that exchanges information with this communication network.

BACKGROUND OF THE INVENTION

With the development of new generations of mobile phones, mobile telephone service providers are now able to offer numerous services that enable users to exchange images or videos or to access services of the WAP or Internet type by way of their telephones.

In order to propose the best possible service to their clients, it is useful for these service providers to be able to test their network, so that they have indicators of the quality perceived by the users, especially when web pages or videos are displayed on the screen of the user's telephone. These indicators are for example the display time of an image on the screen, or the visual quality of that image.

At present, such tests are made "manually" by testing technicians equipped with standard mobile phones. This testing mode has numerous disadvantages, especially in terms of cost, but also in terms of the objectivity of the results.

Automatic testing methods for mobile telephones, especially applications executed on PC-type computers, but these methods allow testing only the modem functionality of the telephones, for example by measuring a number of packets exchanged or a response time. These quantitative measures cannot then be used to take into account the actual quality perceived by a user, for instance when he tries to access a web page.

To supplement these methods, automatic validation tools for mobile applications have been developed, but these tools are used to test the mobile phones themselves, not to test a communication network through which data sent by telephone pass. Hence the testing methods employed in these tools are dependent on the mobile phone used, and especially on the operating system installed on that phone. These tools thus cannot be used as such for testing a telecommunication network, because they were developed for only certain types of mobile phones and are not easily adaptable to other phones.

Furthermore, these validation tools are not generally integrated into the mobile phone itself, and thus they cannot be used permanently, since they are an annoyance to the users.

SUMMARY OF THE INVENTION

The invention seeks to overcome at least of the aforementioned disadvantages. The invention pertains to the field of mobile telephone networks but also any other communication network, such as landline-based networks. In fact, landline telephones or other communication terminals, such as picture phone applications, for which it may be important to perform tests at the level of the quality perceived by the users.

The invention relates to a method for testing a communication network by way of a terminal, the terminal being provided with a screen and exchanging information via the communication network. This method includes the following steps:

the step of periodically retrieving the values of some or all of the pixels of the terminal screen;
the step of calculating, from these pixel values, one or more parameters representing the contents of the screen; and
the step of transferring the parameter or parameters to a backup and/or analysis means.

The method according to the invention, by retrieving the pixel values of the screen, makes it possible to take into account the reality perceived by a user looking at the screen.

The terminal is for example a mobile phone terminal.

Preferably, for testing any network whatever, with any terminal, such as a mobile phone, the parameters calculated are parameters that are independent of the terminal used for performing the tests or of the application for which the terminal is used.

The choice of parameters to calculate can be made for instance by a mobile telephone service provider as a function of the functionalities of its network that it wishes to test.

Depending on the parameters selected, it may be useful to scan the image in one order or another, or not to retrieve all the pixels.

Thus in one embodiment, to retrieve the pixel values, the terminal screen is scanned by a scanning mode selected from among the group comprising: scanning by vertical lines, scanning by horizontal lines, scanning along rectangular zones, and scanning by sampling, in which only the values of a pixel over n, where n is a positive integer, are retrieved.

For example, if a technician wishes to know the time when an image was displayed on the screen and if he knows that an image is displayed line by line, he can choose to retrieve only the values of one column of pixels, each pixel in this column representing on line on the screen.

In the same way, the technician may wish to test the access time to a web page in which a particular symbol, such as an hourglass, is inserted, varying as a function of the state of progress of the display. In that case, it is sufficient to retrieve the pixel values located in the zone on the screen in which this symbol is found.

The terminals, in particular mobile phones, used to perform these tests are provided with operating systems, for instance of the "Microsoft Windows" type. These systems generally include image analysis tools that can be used by the testing method. Thus in one embodiment, in the calculation step, the method uses image processing algorithms that are used for other purposes in the terminal, in particular for determining the colors of the pixels on the screen.

In one variant, the method uses known algorithms for image recognition and identification.

The color determination can be a particularly pertinent criterion for evaluating the visual quality of an image displayed on a screen.

One of the means for evaluating the quality of an image is to compare that image with a reference image corresponding to the one that one seeks to obtain. To that end, in one embodiment, the calculation step includes calculating a rate of similarity of the image displayed on the screen relative to a reference image.

Such a calculation is based on the comparison of the pixel values retrieved with the corresponding pixel values in the reference image. In one embodiment, this comparison can be done periodically in order to show an evolution of the image.

This calculation can be done using existing image processing algorithms that for instance are already integrated with the terminal, in particular a mobile phone, or by using an algorithm such as the following:

```
NbPixel = 0
NbEq = 0
    For each pixel (x,y) and each component c = R,G,B{
    if Abs(Pixel(x,y,c)>white threshold), then{
    NbPixel = NbPixel + 1
    if Abs(Pixel(x,y,c)-reference(x,y,x)) < threshold difference),
    then NbEq =
NbEq + 1
        }
    }
    rate of similarity = NbEq / NbPixel
```

To obtain results that are as representative as possible of reality, in one embodiment, the calculation of the rate of similarity takes into account a tolerance with respect to slight variations in the quality of the images.

In fact, on being transferred, an image can undergo a slight degradation, which will be invisible to the naked eye yet will cause the value of one or more pixels to vary slightly. Since the testing method is intended to measure the quality actually perceived by a user, such degradation need not necessarily be considered a hindrance and hence need not be taken into account in calculating the probability.

The reference images are for instance communicated by the technician who knows the applications he wishes to test and hence the images that are supposed to be obtained.

In a variant, the method includes a learning step in the course of which the images received from the terminal, in particular a telephone, are indexed in order to constitute reference images.

For example, when a user navigates the Internet using a mobile phone and communication are suddenly interrupted, his phone will display a page containing a text on the order of "navigation interrupted". When this page is first displayed, it may be useful to list it as a reference image so that it will be recognized on future appearances. This can consequently make a more-detailed analysis possible of the events that took place in navigating the Internet using the phone.

The calculation of the rate of similarity as defined above is useful to determine whether the image obtained on the screen does correspond well to the one sought, and to determine whether it is of good quality. However, another important aspect in terms of the quality perceived by the user is the time it takes to display this image. To evaluate this time, in one embodiment, the method includes the step of calculating, from the rate of similarity, a rate of filling of the screen.

In fact, if the rate of similarity is equal to 50%, this can mean that the image is severely degraded, or that the image is correct but is being shown on only half of the screen at the time when the measurement was made.

Thus based on the rate of similarity calculated at different times, the rate of filling of the screen can be deduced, and optionally a speed with which images are displayed on the terminal can be calculated.

To that end, in one embodiment, the method includes the step of determining a time limit for the retrieval of the pixel values used for calculating the parameter or parameters.

Furthermore, in one embodiment, the calculation step is performed periodically in order to establish a variation of the parameter or parameters over time.

Thus curves can be traced that make it possible to visualize the evolution of various parameters over the course of time.

These curves and the indications of the display speed can make it possible to obtain information on the performance of the network with regard to transferring data, representing in particular still or moving images.

With a view to fully automating the testing procedure, the method, in one embodiment, includes a preliminary step consisting of sending data to the terminal that simulate the action of a user at that terminal.

In one embodiment, this preliminary step is done by a means that is external to the terminal.

It is in fact possible to develop a "virtual user" for such tests, whose role is to simulate the touch on the keys of the terminal by an actual user. This virtual user can take the form for instance of software installed on a PC-type computer and can be parametrized to simulate various real utilizations.

The various parameter calculations made during the execution of the method can be implemented by calculation means that are integrated with the terminal or that are external to the terminal.

The choice depends in particular on the conditions under which the network tests are performed. If these tests are performed in the laboratory, for example, then it can indeed be valuable to delegate these calculations to external means, which have a calculating power that cannot be obtained in the terminal.

Moreover, it may happen that the tests are performed in a real situation, that is, when a user is in fact using the terminal, such as his mobile phone. In these cases, the calculation means will generally be integrated with the terminal.

On the other hand, even if the parameter calculations are performed in the terminal, it is often preferable to download these parameters in order to analyze them, for example to compile statistics on the quality of the network.

To that end, in one embodiment, the method includes the step of transferring the parameter or parameters calculated to an analysis device that is external to the terminal.

BRIEF DESCRIPTION OF THE DRAWINGS

Further characteristics and advantages of the invention will become apparent from the ensuing non-limiting description of certain modes of embodiment of the invention, the description being made with the aid of the drawings, in which.

DESCRIPTION OF THE EMBODIMENTS

Figure 1:
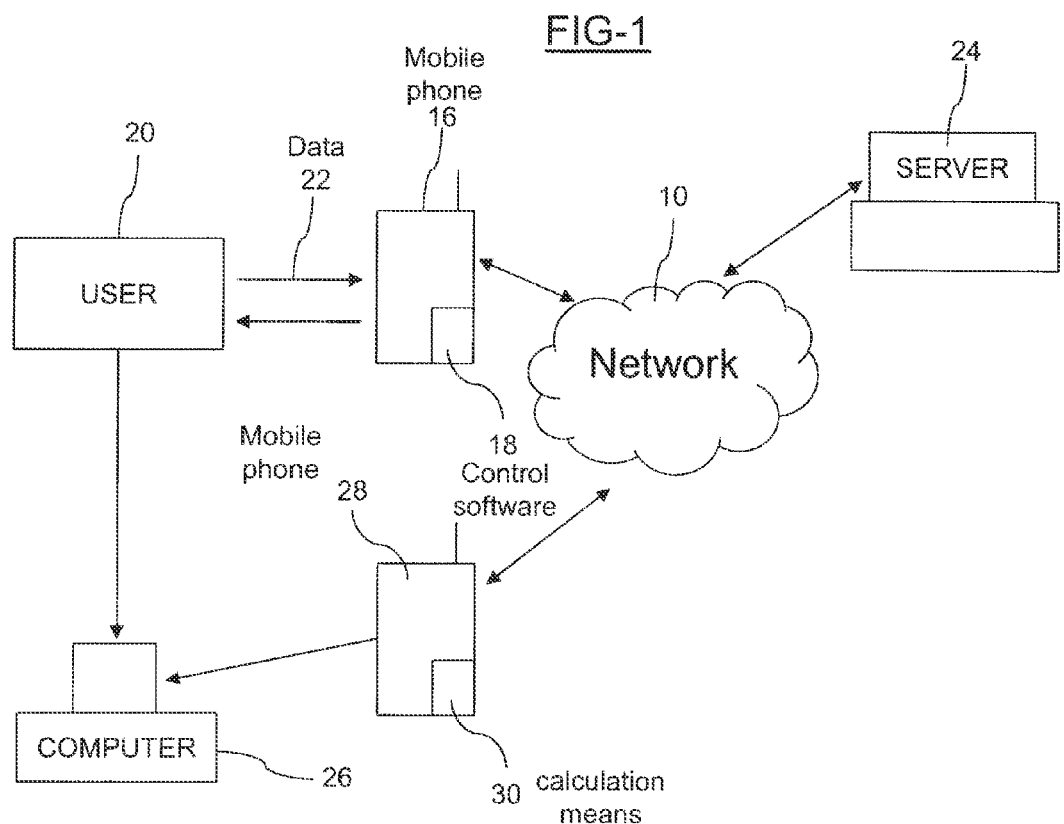
FIG. 1 shows two configurations of a system that makes it possible to test a mobile network using a method according to the invention.

FIG. 1 shows a system used for testing a mobile communication network 10, such as a network of the GPRS type. This system can be used in two possible configurations: a configuration with a virtual user, or a configuration with a real user.

In the virtual configuration, the tests of the network 10 are made via a mobile phone 16, in which a small control software package 18 is integrated. This control software 18 is driven by a virtual user 20 tasked with simulating various actions performed by a user of the phone. To do so, the virtual user 20 sends data 22 representing the touch on certain keys to the control software. For example, the network will be tested when a user wishes to access an Internet site using the "WAP" function on his phone. The data corresponding to the keys that a real user would press is then sent. The telephone then connects, via the network 10, to a server 24 that hosts the Internet site. When the web page is displayed on the screen, the virtual user can read the pixel values of the screen of the telephone 10. Based on these values, the virtual user performs various calculations and sends the results of these calculations to a computer 26 that includes means for analyzing these results.

The second configuration is used for testing a real function of the telephone, that is, when a user uses it daily. Hence the quality tests can be performed for applications that are actually requested by users.

In this configuration, the network 10 is tested via a phone 28 that is provided with means for calculating various parameters. This calculations are made in particular based on the screen pixel values, and these values are also retrieved by the calculation means 30. In that case, the phone 28 sends the results of these calculations directly to the computer 26 so that they will be analyzed.

Figure 2:
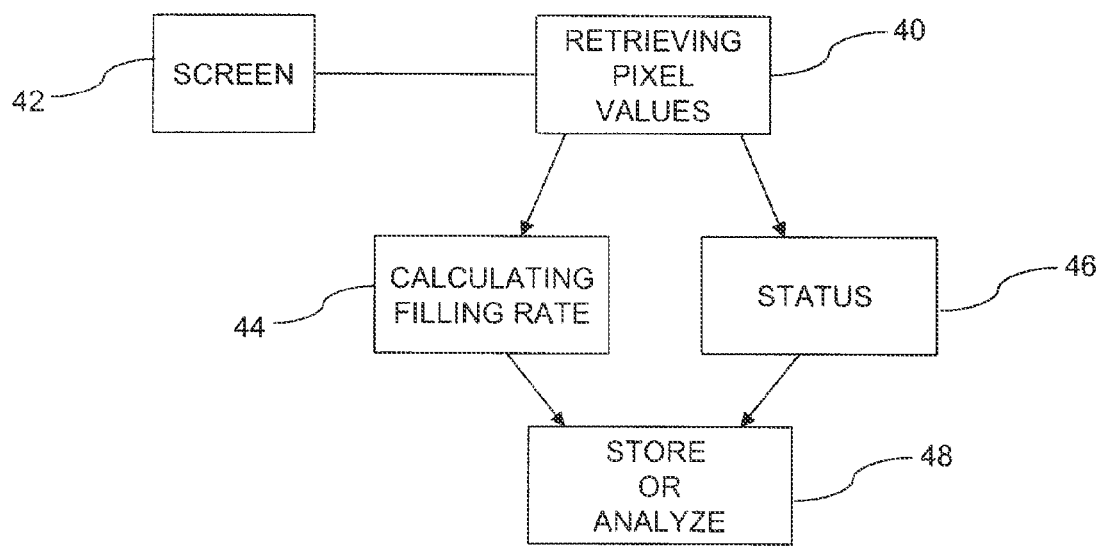
FIG. 2 shows the various steps in a testing method according to the invention.

FIG. 2 shows various steps in a testing method, these steps being performed for example by means that are integrated with a virtual user.

The first step (40) consists of retrieving the pixel values from a mobile phone screen 42. To perform this retrieval, an existing function can be used directly, for instance the "Get-Pixel" function in the "Microsoft Windows" environment. If such a function does not exist in the operating system of the terminal, then the pixel values can be retrieved for example by reading them directly from the video memory of the terminal.

Depending on the tests one wishes to perform, scanning is employed by vertical lines or by rectangular zones. The screen can also be scanned by subsampling, that is, by analyzing only a single pixel over n, n being an integer.

The following step consists of performing the parameter calculations based on these retrieved pixel values. Of the parameters that can be calculated, rate of screen filling (44) or the status of an application (46) can be named in particular.

In the case of calculating the filling rate (44), a periodic comparison is made of the zones on the screen that are scanned relative to one or more reference images. Based on this comparison, a rate of similarity is calculated in accordance with a dedicated algorithm, and with a certain tolerance with regard to slight variations in the quality of the images. This rate of similarity allows us to obtain the filling rate.

The second case (46) relates to using the phone to access a given application. In that case, the colors of certain zones on the screen will be analyzed to determine the progress of the transfer of the data representing the application. For example, certain applications are such that a symbol of a particular color appears in a predetermined zone on the screen during the transfer. In that case, the transfer status can be detected by analyzing all or some of the pixels in that zone; if the combination of colors of these pixels is red, this means that the transfer is ongoing, while when it is green, this means that the transfer has been completed. Other applications make use of a graphic bar that indicates the progress of the transfer, and in that case the progress can be measured by measuring the length of the bar, this length measurement being done for example by sampling the number of pixels that are a certain color.

Once the parameters have been calculated, they are transferred (48) to storage and/or analysis means, making it possible in particular to calculate various indicators of the quality of the network.

The invention claimed is:

1. A method for testing a communications network comprising the steps of:

exchanging information with said communications network by a terminal comprising a screen;

periodically retrieving values of some or all of pixels displayed on said screen representing information received from said communications network by said terminal;

calculating one or more parameters representing contents of said screen based on said values of some or all of said pixels, thereby determining the quality and performance of said communications network by said terminal; and transferring said one or more parameters to a storage device or an analysis device for further analysis by said terminal.

2. The method of claim 1, wherein the retrieving step further comprises the step of scanning said screen by said terminal using one of the following scanning mode: scanning by vertical lines, scanning by horizontal lines, or scanning along rectangular zones.

3. The method of claim 1, wherein the retrieving step comprises said terminal retrieving only said values of pixels greater than a predetermined positive integer.

4. The method of claim 1, wherein the calculating step further comprises said terminal calculating a rate of similarity of an image displayed on said screen relative to a reference image.

5. The method of claim 1, wherein the calculating step further comprises said terminal calculating a rate of similarity of an image displayed on said screen relative to a reference image considering tolerance with respect to slight variations in a quality of said image.

6. The method of claim 2, further comprising the step of receiving an image from a server over said communications network by said terminal; displaying said image on said screen by said terminal; and indexing said image as a reference image by said terminal.

7. The method of claim 4, further comprising the step of calculating a rate of filling of said screen from said rate of similarity by said terminal.

8. The method of claim 1, further comprising the step of determining a time limit for retrieving said values of pixels used in calculating said one or more parameters by said terminal.

9. The method of claim 1, wherein said calculating step further comprises said terminal periodically calculating said one or more parameters to establish a variation of said parameter or parameters over time.

10. The method of claim 1, further comprising the steps of preliminary receiving by said terminal data to simulate an action of a user using said terminal; and transmitting said data to a server over said communications network.

11. The method of claim 10, further comprising the step of receiving said information in response to said data from said server over said communications network by said terminal.

12. The method of claim 1, wherein the calculating step is performed by a computer external to said terminal.

13. The method of claim 1, wherein said communications network is a mobile communications network; wherein said terminal is a mobile device comprising a screen; and wherein the step of exchanging information comprises said mobile device exchanging information with said mobile communications network.

14. The method of claim 1, wherein the exchanging step comprises said terminal receiving web pages, images or video from a server over said communications network.

15. The method of claim 1, wherein the exchanging step comprises said terminal accessing a web service over said communications network.

* * * * *